(12) United States Patent
Sanghavi et al.

(10) Patent No.: US 10,534,846 B1
(45) Date of Patent: Jan. 14, 2020

(54) PAGE STREAM SEGMENTATION

(71) Applicant: PricewaterhouseCoopers LLP, New York, NY (US)

(72) Inventors: Abhishek Sanghavi, Plano, TX (US); Michael Flynn, Pelham, NY (US); Joseph Harrington, New York, NY (US); Michael Baccala, Ocean City, NJ (US)

(73) Assignee: PricewaterhouseCoopers LLP, New York, NY (US)

( * ) Notice: Subject to any disclaimer, the term of this patent is extended or adjusted under 35 U.S.C. 154(b) by 0 days.

(21) Appl. No.: 16/434,988

(22) Filed: Jun. 7, 2019

Related U.S. Application Data (60) Provisional application No. 62/746,931, filed on Oct. 17, 2018.

(51) Int. Cl.
*G06F 17/21* (2006.01)
*G06K 9/00* (2006.01)

(52) U.S. Cl.
CPC .......... *G06F 17/217* (2013.01); *G06F 17/214* (2013.01); *G06K 9/00463* (2013.01); *G06K 9/00469* (2013.01); *G06K 2209/01* (2013.01)

(58) Field of Classification Search
CPC .................................................... G06F 17/217
See application file for complete search history.

(56) References Cited

U.S. PATENT DOCUMENTS

| | | | | |
|---|---|---|---|---|
| 2006/0031764 A1* | 2/2006 | Keyser | .................. | G06F 17/217 715/251 |
| 2006/0156226 A1* | 7/2006 | Dejean | .................. | G06F 17/217 715/251 |
| 2012/0324341 A1* | 12/2012 | Dejean | .................. | G06F 17/211 715/243 |
| 2014/0270545 A1* | 9/2014 | Ghessassi | .......... | G06K 9/00483 382/217 |
| 2014/0280167 A1* | 9/2014 | Ghessassi | .......... | G06K 9/00483 707/738 |

\* cited by examiner

*Primary Examiner* — Scott T Baderman
*Assistant Examiner* — Seung Woon Jung
(74) *Attorney, Agent, or Firm* — Morrison & Foerster LLP (57) ABSTRACT

Described are system, method, and computer-program product embodiments for performing language-agnostic page stream segmentation. In some embodiments, a method includes receiving a multi-page file associated with a plurality of documents. A plurality of characters present on each page of the set of consecutive pages, including a first page and a second page, of the multi-page file can be detected. A plurality of structural data for each page can be computed based on a position and a font format for one or more of the detected characters. The plurality of structural data between the first page and the second page can be compared to determine whether the second page corresponds to a boundary between two documents of the plurality of documents. The multi-page file can be segmented at the second page in response to determining that the second page corresponds to the boundary.

28 Claims, 6 Drawing Sheets

PAGE STREAM SEGMENTATION

CROSS REFERENCE TO RELATED APPLICATIONS

This application claims the benefit of U.S. Provisional Application No. 62/746,931, filed on Oct. 17, 2018, the entire content of which is incorporated herein by reference.

FIELD OF THE DISCLOSURE

This disclosure relates generally to system and methods for performing page stream segmentation and in particular, for splitting a multi-page file into documents based on structural data computed for each page.

BACKGROUND OF THE DISCLOSURE

In recent years, more and more paper documents are being digitized for electronic storage and transmission. Often, document digitization involves scanning pages from multiple documents and storing the scanned pages in a single large file. Page stream segmentation is the process by which a stream of pages in a multi-page file (e.g., scanned pages) can be automatically separated into different documents.

SUMMARY OF THE DISCLOSURE

Current existing commercial tools can perform page stream segmentation for a multi-page file by searching for one or more indicators specified and input by a user. For example, one commercial tool allows the user to input beginning and ending page numbers, which can be detected by the tool on each page of a page stream to determine a page boundary between two documents in the page stream. Another commercial tool allows the user to choose between different indicators that the tool can detect on each page of the page stream to determine page boundaries between documents. For example, such a tool may allow the user to select one of the following indicators: a blank page, a bookmark in the page, or a barcode on the page. This tool, however, may require the user to add the blank page, the bookmark, or the barcode during document scanning. Other tools may allow the user to input certain strings that the tool can search to determine the page boundary.

Each of these tools, however, requires the user to possess and/or input prior knowledge of the contents (e.g., specific page numbers or text) of documents in the page stream before the tool can determine the page boundaries for documents contained in the page stream. Often users lack prior knowledge of such contents, which would render these tools ineffective. Additionally, documents do not necessarily have page numbers or barcodes, which are example indicators that many existing tools use to determine page boundaries. Moreover, the contents in a document may be in a foreign language (to the user), which would prevent the user from being able to identify specific terms to be searched by the tool to perform page stream segmentation.

Additionally, these tools often implement static, pre-programmed rules that dictate whether a specific page is determined to be a page boundary between documents. Such implementations, however, prevent accurately determining page boundaries for new document formats or for documents having formats and content that have not been already pre-programmed in the rules. Further, whenever one of these tools makes an inaccurate determination for a page boundary in a multi-page file, the user may need to re-program the rules to enable the tool to make accurate page boundary determinations for future files similar to that of the multi-page file.

To address the problems noted above, the disclosed embodiments describe system, method, apparatus, and computer program product embodiments for performing language-agnostic page stream segmentation. In some embodiments, a method includes receiving a multi-page file associated with a plurality of documents. A plurality of characters present on each page of a set of consecutive pages of the multi-page file can be detected. In some embodiments, the set of consecutive pages can include at least a first page and a second page. A plurality of structural data for each page can be computed based on a position and a font format for one or more characters of the plurality of characters detected on that page. Then, the plurality of structural data between the first and the second pages of the set of consecutive pages can be compared to determine whether the second page corresponds to a boundary between two documents of the plurality of documents. The multi-page file can be segmented at the second page in response to determining that the second page corresponds to the boundary. Accordingly, the disclosed embodiments enable page boundaries of the multi-page file to be determined based on structural data derived from the pages themselves, and do not require users to possess and/or input prior knowledge of the contents or formats of the multi-page file.

In some embodiments, a method for performing language-agnostic page stream segmentation includes: receiving a multi-page file associated with a plurality of documents; detecting a plurality of characters present on each page of a set of consecutive pages in the multi-page file, where the set of consecutive pages comprises a first page and a second page; computing a plurality of structural data for each page based on a position and a font format for one or more characters detected on that page; comparing the plurality of structural data between the first page and the second page of the set of consecutive pages to determine whether the second page corresponds to a boundary between two documents of the plurality of documents; and segmenting the multi-page file at the second page in response to determining that the second page corresponds to the boundary.

In some embodiments, the set of consecutive pages includes a third page, the first page precedes the second page and the third page follows the second page, and the method includes: comparing the plurality of structural data between the first and second pages of the set of consecutive pages and between the second and third pages of the set of consecutive pages to determine whether the second page corresponds to a boundary between two documents of the plurality of documents.

In some embodiments, segmenting the multi-page file includes: storing an indicator that the second page is a boundary between two documents. In some embodiments, segmenting the multi-page file at the second page includes: requesting a user to confirm whether the indicator of the second page corresponds to the boundary between two documents; and splitting the multi-page file at the second page in response to receiving an input from the user indicating that the second page corresponds to the boundary.

In some embodiments, comparing the plurality of structural data between the first and second pages of the set of consecutive pages includes: providing the plurality of structural data for each page as inputs into a machine learning model configured to output a determination as to whether the second page corresponds to the boundary between two documents. In some embodiments, the machine learning model is a binary classifier.

In some embodiments, the method includes: determining that the second page corresponds to the boundary between two documents; requesting a user to confirm an accuracy of the determination that the second page corresponds to the boundary; and updating the machine learning model based on the plurality of structural data and an input from the user indicating the accuracy of the determination.

In some embodiments, computing the plurality of structural data for each page includes: determining a position and a font format for each character of the plurality of characters detected on that page.

In some embodiments, detecting the plurality of characters on each page includes: performing optical character recognition (OCR) on the page to detect the plurality of characters present on the page. In some embodiments, performing the OCR includes: for each page, generating a text layer comprising the plurality of characters for that page, where the text layer maintains the position and the font format for each character of the plurality of characters.

In some embodiments, the multi-page file includes a Tagged Image File Format (TIFF) file or a Portable Document Format (PDF) file.

In some embodiments, computing the plurality of structural data for each page includes: determining a page size of each page. In some embodiments, the font format includes one or more of a font size, a font style, or a font type. In some embodiments, computing the plurality of structural data for each page includes: determining a font size of each character on the page based on the font format; and determining a minimum font size, a maximum font size, and one or more measures of central tendency for font size based on the font size determined for each character.

In some embodiments, the position for a character includes two or more pairs of coordinates that define a region that the character occupies on the page.

In some embodiments, computing the plurality of structural data for each page includes: determining header and footer data for each page based on the position of each character, an upper threshold value, and a lower threshold value, wherein the header data includes a character having a position above the upper threshold value, and wherein the footer data includes a character having a position below the lower threshold value.

In some embodiments, comparing the plurality of structural data between the first and second pages of the set of consecutive pages includes comparing header data, footer data, or header and footer data of the first and second pages.

In some embodiments, comparing the header data, the footer data, or the header and footer data of the first and second pages includes at least one of: comparing the header data of the first and second pages; comparing the footer data of the first and second pages; or comparing the footer data of the first page with the header data of the second page.

In some embodiments, comparing the header data, the footer data, or the header and footer data of the first and second pages includes at least one of: calculating a cosine similarity between the header data of the first and second pages; calculating a cosine similarity between the footer data of the first and second pages; calculating a cosine similarity between the footer data of the first page and the header data of the second page; or calculating a cosine similarity between the footer data of the second page and the header data of the first page.

In some embodiments, segmenting the multi-page file includes: generating at least two files to correspond to two documents of the plurality of documents based on the determination that the second page corresponds to the boundary.

In some embodiments, the set of consecutive pages includes a third page, the first page precedes the second page and the third page follows the second page, the at least two files includes a first file and a second file, and generating the at least two files includes one of: generating the first file to include the first page and the second file to include the second and third pages; or generating the second file to include the third page and the first file to include the first and second pages.

In some embodiments, the first page precedes the second page.

In some embodiments, the second page precedes the first page.

In some embodiments, the multi-page file includes a plurality of pages including the set of consecutive pages, and the method includes: comparing the plurality of structural data of the second page in the set of consecutive pages with the plurality of structural data in each other page of the set of consecutive pages to determine whether the second page corresponds to the boundary between two documents of the plurality of documents.

In some embodiments, the set of consecutive pages includes a predetermined number of consecutive pages that is at least three.

In some embodiments, the set of consecutive pages includes a first subset of consecutive pages adjacent to and preceding the second page and comprises a second subset of consecutive pages adjacent to and following the second page. In some embodiments, the first subset of consecutive pages includes a first predetermined number of consecutive pages and the second subset of consecutive pages includes a second predetermined number of consecutive pages. In some embodiments, the first and second predetermined numbers are user configurable.

In some embodiments, the multi-page file includes a plurality of pages, and the method includes: for each page in the plurality of pages: computing a plurality of structural data for a set of consecutive pages specific to and including the page, and comparing the plurality of structural data of the page with the plurality of structural data of each other page in the set of consecutive pages specific to the page to determine whether the page corresponds to a boundary between two documents of the plurality of documents.

In some embodiments, a system for performing language-agnostic page stream segmentation includes: one or more processors and memory storing one or more programs that when executed by the one or more processors cause the one or more processors to: receive a multi-page file associated with a plurality of documents; detect a plurality of characters present on each page of a set of consecutive pages of the multi-page file, where the set of consecutive pages comprises a first page and a second page; compute a plurality of structural data for each page based on a position and a font format for each character of the plurality of characters detected on that page; compare the plurality of structural data between the first page and the second page of the set of consecutive pages to determine whether the second page corresponds to a boundary between two documents of the plurality of documents; and segment the multi-page file at the second page if it is determined that the second page corresponds to the boundary.

In some embodiments, a non-transitory computer-readable storage medium storing one or more programs configured to be executed by one or more processors of a device with one or more processors and memory, the one or more programs including instructions for: receiving a multi-page file associated with a plurality of documents; detecting a plurality of characters present on each page of a set of consecutive pages in the multi-page file, wherein the set of consecutive pages comprises a first page and a second page; computing a plurality of structural data for each page based on a position and a font format for one or more characters detected on that page; comparing the plurality of structural data between the first page and the second page of the set of consecutive page to determine whether the second page corresponds to a boundary between two documents of the plurality of documents; and segmenting the multi-page file at the second page in response to determining that the second page corresponds to the boundary.

BRIEF DESCRIPTIONS OF THE DRAWINGS

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods and instrumentalities disclosed. In the drawings.

DETAILED DESCRIPTION

Described below are systems, methods, apparatuses, and computer program product embodiments for performing language-agnostic page stream segmentation based on structural data derived from each page of a multi-page file. In some embodiments, to identify document boundaries in a multi-page file received at a system, the system can compare structural data between consecutive pages in the multi-page file. To compute the structural data for each page of the multi-page file, the system can perform optical character recognition (OCR) on each page to detect a plurality of characters for that page and determine a position and a font format for each character detected on that page. Based on the result of the structural data comparisons between two or more pages, the system can determine whether a page in the multi-page file corresponds to a boundary between two documents and automatically split the multi-page file at the page. Accordingly, embodiments disclosed herein improves upon current commercial tools because document boundaries in a multi-page file can be automatically detected based on the multi-page file alone and does not require users to input prior knowledge of document contents.

As used herein, "structural data" for a page can be understood to refer to metadata derived from the page and related to a layout or a format of the page or its contents. In some embodiments, the structural data for a page can be computed, in part, based on a position or a font format of each character on the page. Example structural data that may be computed based on at least a character's position on a page may include, without limitation, an identified header, an identified footer, page margins, indent size, or line spacing. Example structural data that may be computed based on at least a character's font format may include, without limitation, text density or statistical measures (e.g., max, min, mode, median, etc.) for font sizes or font types. In some embodiments, structural data can be computed based on a combination of other structural data.

Figure 1:
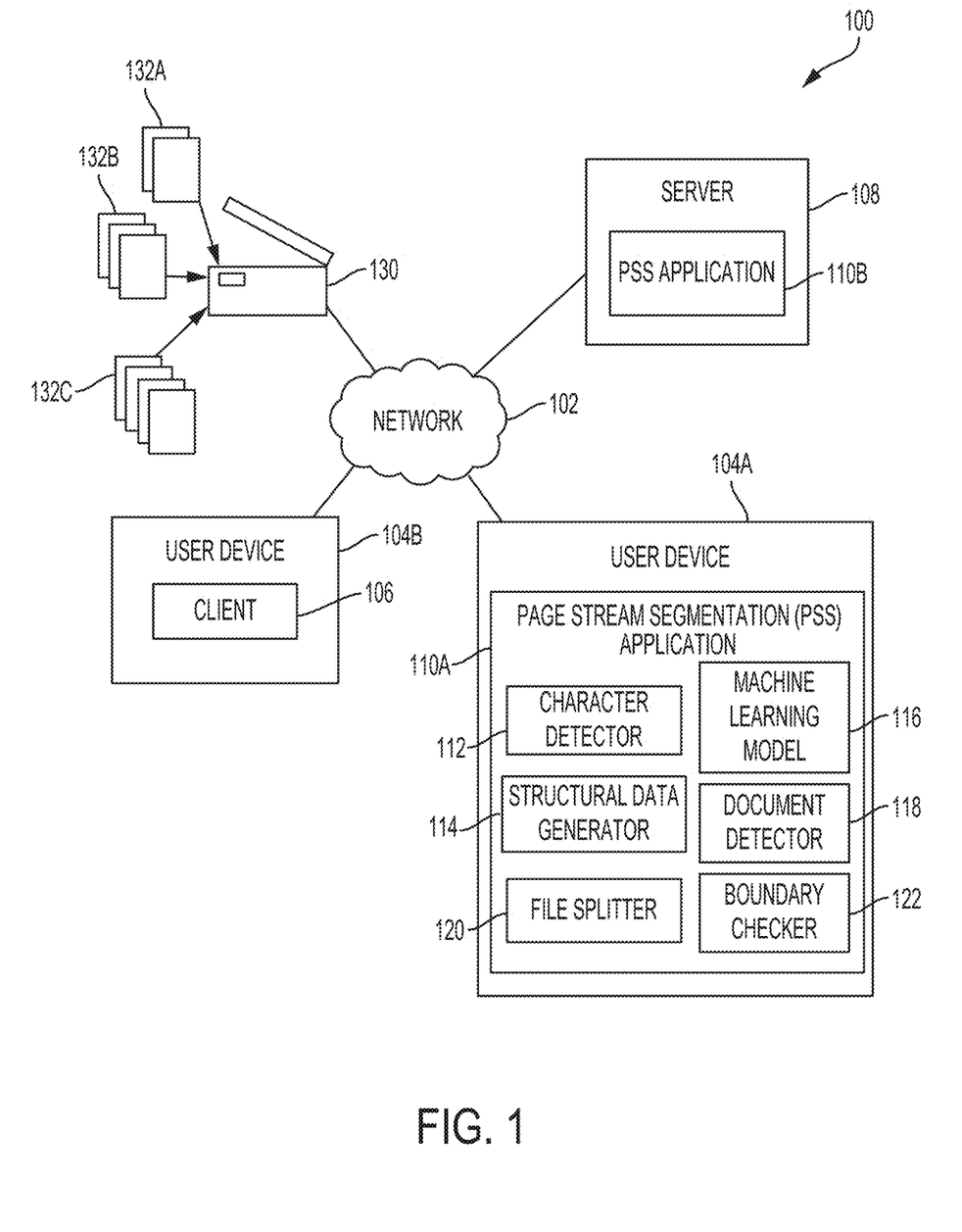
FIG. 1 illustrates a system for performing page stream segmentation on a multi-page file, according to some embodiments.

FIG. 1 illustrates a system 100 for performing page stream segmentation, according to some embodiments. System 100 includes a network 102 communicatively connected to user devices 104A-B, a server 108, a scanning device 130, or a combination thereof. Network 102 can include wired and/or wireless networks that span a wide area network (WAN) such as the Internet, an intranet, a local area network (LAN), a metropolitan area network (MAN), etc. Network 102 may use any of a plurality of communications standards, protocols, and technologies, including but not limited to Global System for Mobile Communications (GSM), Enhanced Data GSM Environment (EDGE), long term evolution (LTE), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), Wi-MAX, etc.

In some embodiments, scanning device 130 (e.g., a scanner) can be configured to scan multiple documents 132A-C to generate a single multi-page file. Documents 132A-C may include images, printed text, or handwritten or hand-drawn content on a physical page. In some embodiments, the multi-page file can be generated as a Tagged Image File Format (TIFF) file, a Portable Document Format (PDF), or other file formats configured to store multiple pages. While the following embodiments may be described with respect to segmenting scanned documents in the multi-page file, the present disclosure is not so limiting because the embodiments described herein are capable of performing page stream segmentation for various types of documents, including scanned documents or computer-generated document. For example, the computer-generated document may include a document generated by a word processor program (e.g., MICROSOFT WORD) or content-editing software (e.g., ADOBE ACROBAT).

As discussed above, individuals or companies may want to scan paper documents to generate digital files for electronic storage and/or transmission. The single multi-page file including many documents can be transmitted on network 102 and can be received by a user operating, for example, one of user devices 104A-B. User devices 104A-B may be computing devices capable of accessing network 102. For example, user devices 104A-B may include a workstation, a desktop computer, a laptop, a tablet, a mobile device such as a smartphone, etc.

In some embodiments, to automatically segment the multi-page file into two or more constituent documents, the user can provide the multi-page file to a page stream segmentation (PSS) application 110A implemented on user device 104A. For example, PSS application 110A may be a software application that the user downloads from server 108 onto user device 104A. In some embodiments, the functionality of PSS application 110A can be implemented in PSS application 110B stored on server 108 (e.g., a cloud server or a physical server). In these embodiments, the user can operate user device 104B having a client 106 to access PSS application 110B at server 108. For example, web client 106 may be a web browser (e.g., CHROME, IE, SAFARI, etc.) or a client application capable of interfacing with server 108 via network 102.

In some embodiments, as will be further described below, PSS application 110A improves upon current existing commercial tools because PSS application 110A can automatically segment a multi-page file into multiple constituent documents without requesting user input. Therefore, PSS application 110A may be capable of segmenting the multi-page file independent of the language of a document and regardless of how documents were joined together to form the multi-page file. In some embodiments, to achieve these improvements, PSS application 110A can be configured to include the following components: character detector 112, structural data generator 114, machine learning model 116, document detector 118, file splitter 120, and boundary check 122. In some embodiments, each component may include a set of programming instructions stored in memory of user device 104A and executable by one or more processors of user device 104A.

In some embodiments, a multi-page file received by PSS application 110A may include a plurality of pages that corresponds to multiple documents. In some embodiments, PSS application 110A can parse the multi-page file page by page in a page stream, where multiple pages can be buffered. As will be further described below, PSS application 110A can be configured to compare structural data derived, in part, from textual content of consecutive pages in the page stream to segment the multi-page file into multiple documents.

In some embodiments, character detector 112 can be configured to detect and recognize characters on each page of the received multi-page file. In some embodiments, a page of the multi-page file may be generated as an image, which does have any associated text. After detecting and recognizing the characters on a page, character detector 112 may be configured to include the detected characters in textual metadata to associate with the page. In some embodiments, the textual metadata for a page may be generated as a text layer in the page, which can retain a formatting and a position of detected characters on that page. In some embodiments, character detector 112 can perform optical character recognition (OCR) on each page to generate the textual metadata for each page. For example, character detector 112 may include OCR software such as ABBYY FINEREADER or TESSERACT to detect and recognize the characters on each page.

In some embodiments, structural data generator 114 can be configured to compute structural data for each page. Structural data for a page may refer to metadata computed based on a layout or a format of the page or its contents. In some embodiments, structural data generator 114 can compute the structural data for a page based on a position, a font format, or both the position and the font format of one or more characters detected on that page. For example, structural data may include page margins, which may be computed based on the positions of detected characters on the page. In another example, structural data may include a maximum font size on the page, which may be determined based on the font formats of detected characters on the page. Various types and examples of structural data are described below with respect to FIG. 2.

In some embodiments, structural data generator 114 can be configured to extract the font format and the position for each detected character on the page based on the textual metadata generated by character detector 112. For example, structural data generator 114 may include text extraction software such as PDFMINER to determine the font format and the position for each detected character. In some embodiments, structural data generator 114 can parse the text layer of the page to extract character fonts and positions. In some embodiments, the position for a character on a page can include two or more pairs of coordinates that define a region that the character occupies on the page. A single pair of coordinates can define a location on the page. In some embodiments, the font format of a character can include a font size (e.g., 14 point), a font type (e.g., TIMES NEW ROMAN), a font style (e.g., italicized, bold, underlined, strikeout, etc.), or a combination thereof for that character. In some embodiments, the font type can refer to a font family including variants of a font.

In some embodiments, document detector 118 can be configured to determine document boundaries in the multi-page file based on the structural data derived by structural data generator 114 for a plurality of consecutive pages in the multi-page file. In some embodiments, document detector 118 can be configured to compare the structural data of a particular page with the structural data of one or more pages from a set of consecutive pages to determine whether that particular page in the multi-page file corresponds to a document boundary. In some embodiments, the set of consecutive pages includes one or more pages adjacent to that particular page. In some embodiments, the set of consecutive pages includes a first subset of consecutive pages following and adjacent to the particular page and includes a second subset of consecutive pages preceding and adjacent to the particular page. In some embodiments, the first and second subset of consecutive pages can correspond to a first and a second predetermined number of pages that are selected based on input from the user. In some embodiments, the first and second predetermined numbers can be set to a default value (e.g., one, two, etc.).

In some embodiments, document detector 118 can compare the structural data for sets of a predetermined number of consecutive pages in the multi-page file to determine whether the page corresponds to the document boundary. For example, to determine whether a specific page in the multi-page file corresponds to a document boundary, document detector 118 may compare the structural data for the specific page against the structural data for each page from a set of a predetermined number of consecutive pages that are selected for that specific page. In some embodiments, the predetermined number of consecutive pages is at least two pages. For example, the predetermined number of consecutive pages may be exactly three pages, and document detector 118 may compare the structural data of a page of the three pages with that of exactly two adjacent pages (i.e., the previous page and the next page). While the following disclosure may describe comparing structural data for sets of three consecutive pages, a larger number of consecutive pages can also be compared. In these cases, at least one of the first and second numbers of consecutive pages, discussed above, will be greater than one.

In some embodiments, to determine a document boundary, document detector 118 can be configured to generate metadata comparisons that quantify a similarity of portions of structural data between pages in one or more pairs of pages. For example, for a particular page associated with a set of three consecutive pages in which the particular page is the middle page in the set, document detector 118 may quantify the similarity between structural data of that page and that of the previous, adjacent page and between structural data of that page and that of the next, adjacent page. In another example, for a particular page associated with a set of five consecutive pages in which the particular page is the middle page in the set, document detector 118 may quantify the similarity between structural data of that page and that of one or more of the other pages (e.g., one or two of the consecutive pages preceding the particular page or one or more of the consecutive pages following the particular page) in the set of consecutive pages. Example metadata comparisons are further described below with respect to FIG. 2.

In some embodiments, to determine document boundaries, document detector 118 can be configured to input structural data for a plurality of pages, metadata comparisons between structural data of two pages, or both to machine learning model 116. In some embodiments, machine learning model 116 can be configured as a binary classifier that predicts whether a page corresponds to a page boundary between documents based on each input or combination of inputs received for the page. For example, machine learning model 116 may determine that the page is the start of a new document based on inputs including: structural data for a set of consecutive pages including the page, the previous page, and the next page; metadata comparisons between structural data of pairs of pages of the set of consecutive pages in which each pair of pages includes the page of interest; or a combination thereof. As discussed above, the set of consecutive pages includes at least two pages, such as exactly three pages. In some embodiments, the binary classifier of machine learning model 116 can include a logarithmic classifier, a support vector machine (SVM) classifier, decision trees, random forests, neural nets, or the like.

In some embodiments, to perform document boundary predictions, machine learning model 116 can be configured to generate weights that are applied to one or more inputs or one or combinations of inputs received for the page based on a training data set. In some embodiments, the training data set can include a multi-page file that concatenates a plurality of distinct documents and include metadata of indicators for document boundaries known to correspond to the plurality of documents. For example, the metadata may be a list (e.g., an array) or a string of 1's and 0's where a 1 is an indicator that the corresponding page is the first page of a document and a 0 is an indicator that the corresponding page is not the first page of a document. In another example, the metadata may be a list or a string of page numbers (of the multi-page file) that correspond to the first page of different documents. In this example, the stored page numbers are indicators of document boundaries. In yet another example, the metadata may include a plurality of page ranges (e.g., pages 5-8 or pages 9-11) in the multi-page file for each distinct document where each page range is an indicator of a document.

In some embodiments, upon determining that a page in the multi-page corresponds to a boundary between two different documents, document detector 118 can generate an indicator identifying the page at which to split the multi-page file. For example, the indicator may be a mark in the multi-page file. In some embodiments, document detector 118 can be configured to generate and store the indicator in a list of pages determined to correspond to document boundaries.

In some embodiments, file splitter 120 can be configured to generate a plurality of documents by splitting the multi-page file at one or more pages determined by document detector 118 to correspond to document boundaries. As a result, file splitter 120 may generate a plurality of documents that correspond to documents 132A-C that were joined to generate the multi-page file. In some embodiments, file splitter 120 may be configured to use software libraries such as PYPDF2 to split multi-page files such as files in the PDF format.

In some embodiments, boundary checker 122 can be configured to request the user to confirm an accuracy of one or more identified document boundaries before file splitter 120 splits the multi-page file into multiple documents. For example, boundary checker 122 may prompt the user to accept or reject a page as a document boundary determined by document detector 118. In some embodiments, as part of the prompting, boundary checker 122 can display the page and one or more adjacent pages to the user. For example, in the case where the set of consecutive pages includes at least three pages, boundary checker 122 may display three pages of the at least three consecutive pages including the page, the previous page, and the next page. In some embodiments, boundary checker 122 can transmit the user's input for the displayed page to file splitter 120, which may be configured to split the multi-page file at the page if the user's input indicates acceptance of the page as the document boundary.

In some embodiments, boundary checker 122 can be configured to generate additional training data (in the format described above) based on the user's input to improve the accuracy of machine learning model 116. In some embodiments, machine learning model 116 can be retrained based on the additional training data. This retraining process may update the previously generated weights in machine learning model 116.

Figure 2:
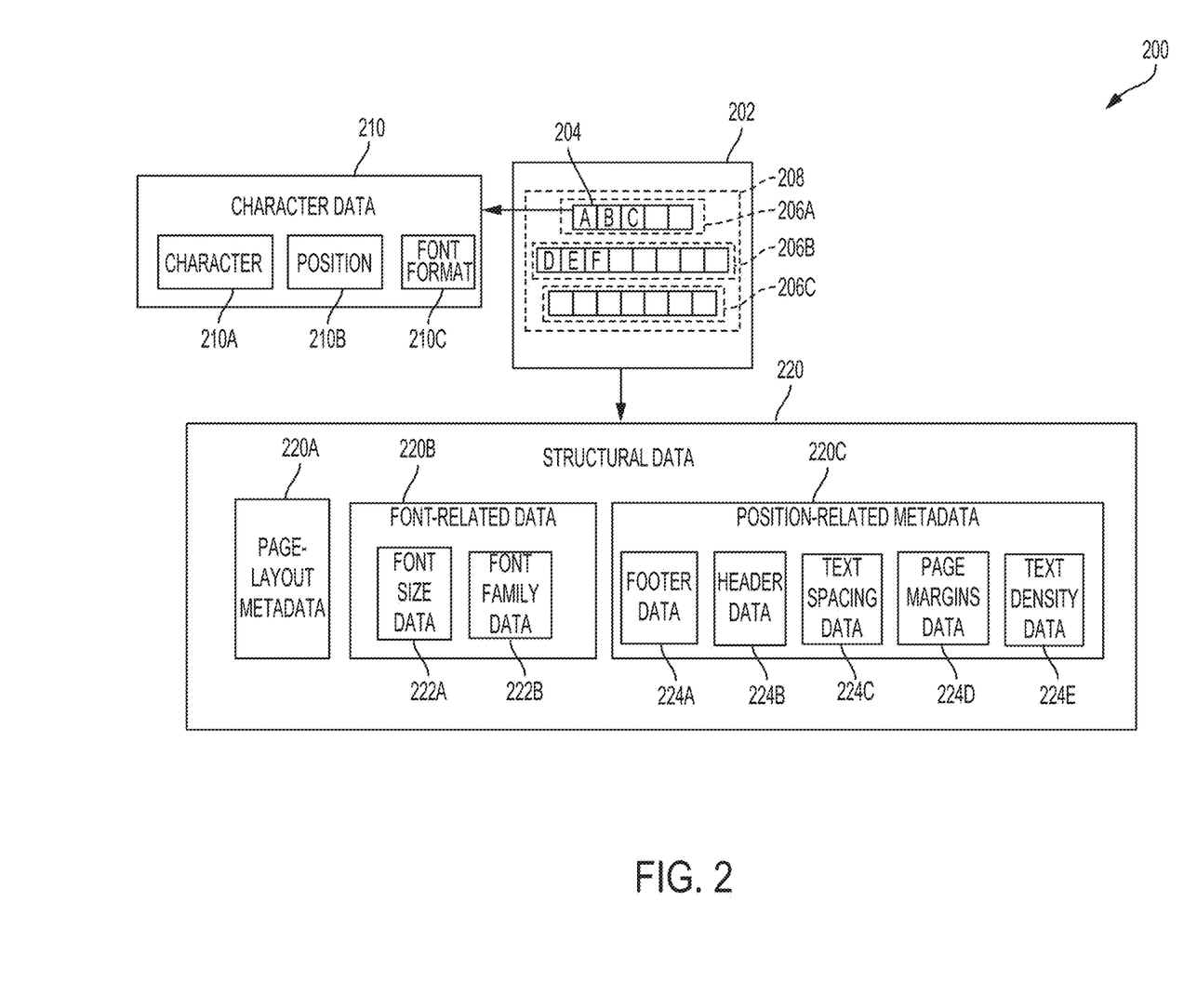
FIG. 2 illustrates a diagram showing example structural data derived for and from a page of the multi-page file, according to some embodiments.

FIG. 2 illustrates a diagram 200 showing example structural data 220 derived for and from a page 202 of a multi-page file, according to some embodiments. For example, the multi-page file may include pages from different documents 132A-C, as described above with respect to FIG. 1. For ease of reference, diagram 200 may be described below with respect to the components of PSS application 110A of FIG. 1.

As shown in diagram 200, page 202 includes a plurality of characters shown as boxes such as the letters A, B, and C. To determine structural data 220, character detector 112 may extract character data of page 202 using, for example, optical character recognition (OCR). For example, character detector 112 may extract character data 210 for each detected character 204 (e.g., the letter A). In some embodiments, character data 210 includes one or more of character 210A, position 210B, and font format 210C. In some embodiments, character 210A includes data identifying the recognized character (e.g., the ASCII for the letter A). In some embodiments, position 210B includes two or more pairs of coordinates that define the location of character 204 on page 202. In some embodiments, each coordinate pair (e.g., a coordinate pair of (61.9, 355.08)) can include two values corresponding to x and y coordinates that specify a location on page 202. In some embodiments, position 210B for character 204 may be two pairs of coordinates that locate opposite corners of the box shown on diagram 200 for character 204. In another embodiment, position 210B for character 204 may be four coordinate pairs that correspond to the four corners that bounds character 204. In some embodiments, font format 210C for character 204 can include one or more of the following: a font size, a font type, or a font style, as described above with respect to structural data generator 114 of FIG. 1.

In some embodiments, structural data generator 114 can compute structural data 220 for page 202 based, in part, on character data 210 detected for one or more detected characters (e.g., character 204) of page 202. Structural data can include page layout metadata 220A, font-related metadata 220B, or position-related metadata 220C. In some embodiments, font-related metadata 220B can include font size data 222A or font family data 222B, each of which may be determined based on font format 210C of one or more characters of page 202. In some embodiments, position-related metadata 220C can include footer data 224A, header data 224B, text spacing data 224C, page margin data 224D, or text density data 224E, each of which may be determined based on position 210B of one or more characters of page 202. As will be further described below with respect to FIG. 3, document detector 118 can compare structural data 220 between pages in each of one or more pairs of pages of the multi-page document to determine whether a particular page corresponds to a document boundary, according to some embodiments. In some embodiments, each of the one or more pairs of pages includes the particular page that is compared to a different page selected from the multi-page document.

In some embodiments, page-layout metadata 220A can include page dimensions such as a length and a width for page 202. Page-layout metadata 220A can also include a page orientation for page 202, which may be determined by comparing orientations of the plurality of detected characters. For example, structural data generator 114 may determine page 202 to be in a portrait orientation if a majority of characters in page 202 are determined to be upright.

In some embodiments, structural data generator 114 can be configured to determine font-related metadata 220B based on font format 210C determined for each detected character on page 202. In some embodiments, font size data 222A can include statistical measures determined based on the font sizes of detected characters on page 202. For example, font size data 222A may include a maximum font size, a minimum font size, one or more measures of central tendency for font sizes, or a combination thereof for page 202. For example, a measure of central tendency may include a mode font size or a median font size. In some embodiments, font family data 222B can include a plurality of font families determined for detected characters on page 202. For example, two characters may be detected to have respective font types ARIAL BLACK and ARIAL narrow. Additionally, these two characters may have different font styles such as bold or underlined. In this example, structural data generator 114 may parse font format 210C for the two characters to determine the font family of ARIAL, which is associated with all variations including font type variations or font style variations.

In some embodiments, structural data generator 114 can be configured to determine position-related metadata 220C based on position 210B determined for one or more detected character on page 202. Page margin data 224D can include a left margin, a right margin, a top margin, a bottom margin, or a combination thereof. In some embodiments, structural data generator 114 can calculate page margin data 224D by determining the maximum and minimum values for the x coordinates and for the y coordinates of detected characters of page 202. For example, to determine the left and right margins, structural data generator 114 may determine the minimum and maximum x coordinates, respectively, of detected characters. Similarly, to determine the top and bottom margins, structural data generator 114 may determine the minimum and maximum y coordinates, respectively, of detected characters.

In some embodiments, text spacing data 224C can include indent size, line spacing, paragraph spacing, or whether text is aligned to the center, the left, the right, or both left and right. To compute line spacing, indent size, and text alignment, structural data generator 114 can be configured to aggregate position 210B for one or more detected characters to determine one or more lines 206A-C on the page, according to some embodiments. Structural data generator 114 may associate two or more pairs of coordinates for each determined of lines 206A-C. For example, the two coordinate pairs for line 206A may correspond to the coordinate for the bottom left corner of the leftmost character (i.e., letter A) and the coordinate for the top right corner character of the rightmost character in line 206A.

To compute spacing between paragraphs, structural data generator 114 can be configured to aggregate one or more lines 206A-C to determine one or more text blocks 208 on the page, according to some embodiments. For example, structural data generator 114 may determine that a change to the leftmost x coordinate of a line (e.g., line 206A) may indicate the start of a new paragraph. Similar to line 206A, structural data generator 114 may associate two or more pairs of coordinates for each text block 208 to define the location of the text block as well as the region on page 202 that text block 208 occupies.

In some embodiments, text density data 224E can be calculated as the ratio between the area of text and the number of characters. Structural data generator 114 may determine the number of characters based on the number of characters on page 202 detected by character detector 112. In some embodiments, structural data generator 114 can calculate the area of text based on the two or more coordinate pairs for characters, lines, or text blocks detected on page 202. For example, structural data generator 114 may find a length and a height of text block 208 by computing the difference between the x and y coordinates, respectively, associated with text block 208. Then, structural data generator 114 may multiple the computed length and height to determine a text area for text block 208. Alternatively, instead of using text block 208, structural data generator 114 may use a similar mechanism to find the text area of each of detected lines 206A-C or detected characters. In some embodiments, the area of text includes the sum of the text areas determined for detected characters, lines, or text blocks of page 202.

In some embodiments, each of footer data 224A and header data 224B can be determined based on the position (including y coordinates) of characters, lines, or text blocks in page 202. For ease of illustration, the following description may refer to the positions of text blocks. However, the following description may be applicable to analyzing the positions of characters or lines, according to some embodiments. In some embodiments, to determine wherein footer data 224A for page 202 includes a text block, structural data generator 114 can determine whether the y coordinates of the text block is within a bottommost, predetermined number of coordinates (e.g., the bottommost five coordinates of page 202). In some embodiment, structural data generator 114 can compare the y coordinate of the text block against a lower threshold value such that the text block is determined to be footer data 224A if the lower threshold value is not exceeded. In some embodiment, structural data generator 114 can compare the y coordinates of detected text blocks to determine a predetermined number of text blocks having the smallest y coordinates. In this embodiment, the predetermined number of text blocks may be determined to be footer data 224A.

In some embodiments, similar to footer data 224A, header data 224B can be determined based on positions of characters, lines, or text blocks. Instead of comparing positions against bottommost or determining the smallest y coordinates, positions of characters, lines, or text blocks, may be compared against the uppermost or the largest y coordinates from positions may be determined. For example, to determine wherein header data 224B for page 202 includes a text block, structural data generator 114 may determine whether the y coordinates of the text block is within an uppermost, predetermined number of coordinates. In another example, structural data generator 114 may compare the y coordinate of the text block against an upper threshold value such that the text block is determined to be header data 224B if the upper threshold value is exceeded. In another example, structural data generator 114 may compare the y coordinates of detected text blocks to determine a predetermined number of text blocks having the largest y coordinates. Again, the above mechanism for determining header data 224B may be applied to lines 206A-C or characters instead of a text block 208.

In some embodiments, in addition to structural data 220A-C automatically computed from page 220 based on extracted character data 210, structural data 220 can include search matches for certain text strings. In some embodiments, a search result can be a binary value indicating a presence (e.g., a value of 1) or an absence (e.g., a value of 0) of a searched text string. For example, PSS application 110A may provide the option to a user to specify one or more text strings (e.g., "Page 1") to be searched on a page to determine whether the page corresponds to a document boundary.

Figure 3:
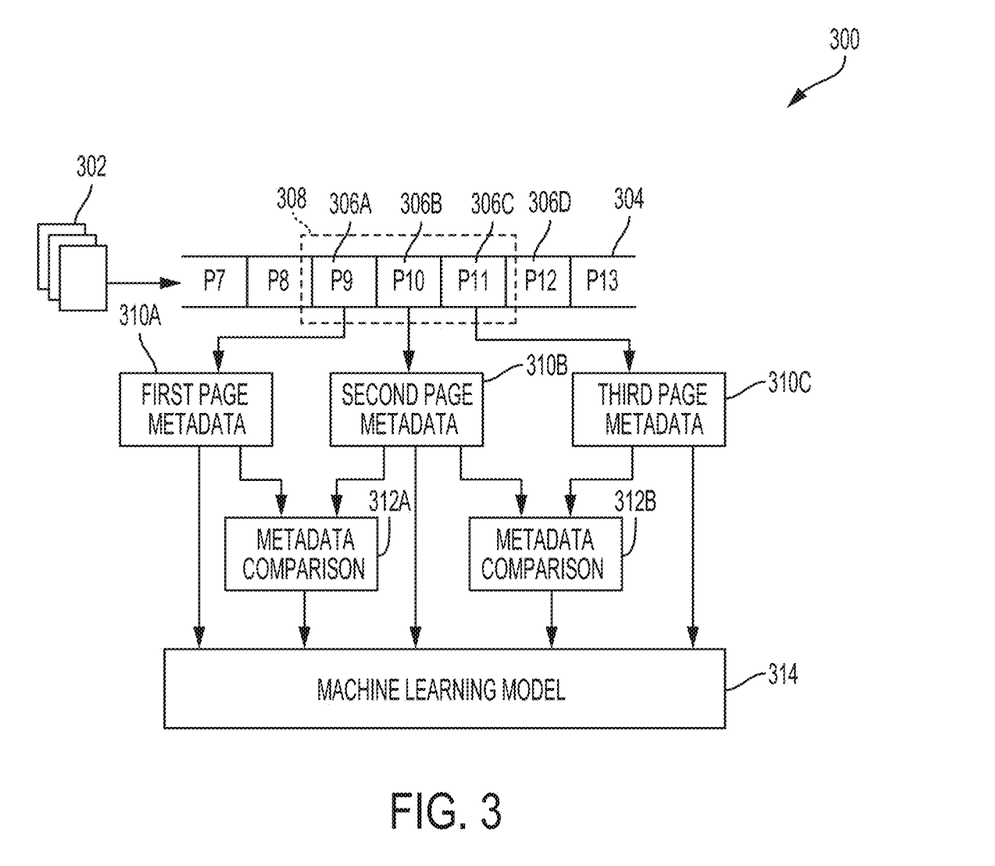
FIG. 3 illustrates a diagram showing how structural data for pages in the multi-page file are compared to determine document boundaries in the multi-page file, according to some embodiments.

FIG. 3 illustrates a diagram 300 showing how structural data for pages in multi-page file 302 are compared to determine document boundaries in multi-page file 302, according to some embodiments. For ease of reference, diagram 300 may be described below with respect to FIGS. 1 and 2. For example, multi-page file 302 may correspond to a multi-page file including multiple documents 132A-C of FIG. 1. Additionally, page 202 of FIG. 2 may be an example of one of pages 306A-D. In some embodiments, PSS application 110A that receives multi-page file 302 can open multi-page file 302 as a page stream 304 including a plurality of pages such as pages 306A-D. As shown in diagram 300, a page is labeled as "P#" such as "P7" for page 7.

In some embodiments, PSS application 110A can compute and maintain data computed for a moving window 308 of a set of consecutive pages (e.g., pages 306A-C) to determine whether a specific page (e.g., page 306B) corresponds to a document boundary (e.g., a last page of a first document or a first page of a second document). In some embodiments, moving window 308 corresponds to a set of consecutive pages including at least two pages: the specific page being analyzed (e.g., page 306B) and a page adjacent to that specific page such as a preceding page (e.g., page 306A is adjacent to and precedes page 306B) or a following page (e.g., page 306C is adjacent to and follows page 306B). In some embodiments, as shown in diagram 300, the set of consecutive pages includes the specific page being analyzed (i.e., page 306B), one or more consecutive pages directly preceding the specific page (e.g., page 306A precedes page 306A), and one or more consecutive pages directly following the specific page (e.g., page 306C follows page 306B). In these embodiments, the set of consecutive pages includes at least three pages.

In some embodiments, by using moving window 308, PSS application 110A may need only to buffer derived data for a predetermined number of consecutive pages in the set of consecutive pages (e.g., two pages, three pages, four pages, etc.) at any instance in time independent of the number of pages of multi-page file 302. This approach can conserve memory storage on user device 104A without reducing boundary detection accuracy because the embodiments of the present disclosure can determine whether a page of interest corresponds to a document boundary based on comparing structural data for a limited number of pages in proximity to the page of interest. For example, to determine whether page 306C corresponds to a page boundary, moving window 308 may be associated with a set of consecutive pages 306B-D specific to page 306C and including at least two consecutive pages.

In some embodiments, to determine whether any given page corresponds to a document boundary, moving window 308 can include a set of consecutive pages from page stream 304 selected for that given page. In some embodiments, the set of consecutive pages includes a first subset of consecutive pages adjacent to and preceding the given page and includes a second subset of consecutive pages adjacent to and following the given page. In some embodiments, the first and second subsets include a first and a second predetermined number of consecutive pages, respectively. In some embodiments, the first and second predetermined numbers are user configurable.

In the example shown in diagram 300, moving window 308 includes a set of three consecutive pages: a first page 306A adjacent to and preceding a second page 306B, the second page 306B, and a third page 306C adjacent to and following page 306B. In this example, first page 306A may correspond to a first subset of consecutive pages in moving window 308 adjacent to and preceding page 306B, and third page 306C may correspond to a second subset of consecutive pages in moving window 308 adjacent to and following page 306B. To determine whether page 306B (i.e., an example of a page of interest) in moving window 308 corresponds to a document boundary, first, second, and third page metadata 310A-C can be generated for respective pages 306A-C (i.e., an example the first, second, and third consecutive pages). In some embodiments, the first, second, and third metadata 310A-C can include structural data (e.g., structural data 220) computed by structural data generator 114 for respective pages 306A-C. For example, first page metadata 310A may include dimensions (e.g., page-layout data 220A) of page 306A, a maximum font size (e.g., font size data 222A) in page 306A, or a text density (e.g., text density 224E) of page 306A. Other types of structural data that may be included in first metadata 310A (and each of second metadata 310B and third metadata 310C) are described above with respect to FIG. 2.

In some embodiments, in addition to generating first, second, and third page metadata 310A-C, structural data generator 114 can be configured to generate metadata comparisons 312A-B between one or more pairs of pages in moving window 308. In particular, metadata comparisons 312A-B can be generated between a page of interest (i.e., page 306B) and each other page (e.g., pages 306A and 306C) in moving window 308. For example, metadata comparison 312A may include the same type of structural data compared between first page metadata 310A and second page metadata 310B. The effect of generating metadata comparisons 312A-B may be to compare the structural data of the second page against that of the previous first page and against that of the following third page. In some embodiments, a result of the comparison can be a score quantifying a similarity between compared structural data. In some embodiments, structural data generator 114 can determine the score by calculating a cosine similarity between the compared structural data. For example, metadata comparison 312B may compare one or more font families in second page metadata 310B against one or more font families in third page metadata 310C using.

In some embodiments, metadata comparison 312A-B can include comparing the headers, footers, or both headers and footers between a pair of pages. For example, metadata comparison 312A may include a comparison: between header data in first and second metadata 310A-B, between footer data in first and second metadata 310A-B, between footer data in first metadata 310A and header data in second metadata 310B, or a combination thereof. Similarly, metadata comparison 312B may include a comparison: between header data in second and third metadata 310B-C, between footer data in second and third metadata 310B-C, between footer data in second metadata 310B and header data in third metadata 310C, or a combination thereof. As discussed above, structural data generator 114 may perform a comparison between headers, footers, or both by computing a cosine similarity. Again, it is to be understood that first, second, and third page metadata 310A-C correspond to the first, second, and third pages of moving window 308.

In some embodiments, first, second, and third page metadata 310A-C and results of metadata comparisons 312A-B are provided as inputs to machine learning model 314 (e.g., machine learning model 116 of FIG. 1) to determine whether page 306B corresponds to a document boundary. In some embodiments, machine learning model 314 can be configured to weight one or more inputs or one or more combinations of inputs to make the document boundary determination, as described above with respect to FIG. 1.

Accordingly, machine learning model 314 can be configured to make document boundary determinations based on metadata comparisons 312A-B between pairs of pages selected from moving window 308 in which each pair of pages includes the page of interest (e.g., page 306B) and another page (e.g., page 306A or 306C) from moving window 308. For example, instead of pages 306A-C being in moving window 308 as shown in diagram 300, moving window 308 may include consecutive pages 306A-306D. In this particular example, to determine whether page 306B (i.e., the page of interest) corresponds to a document boundary, metadata comparisons can be generated for three pairs of pages: pages 306B and 306A; pages 306B and 306C; and pages 306B and 306D.

Figure 4:
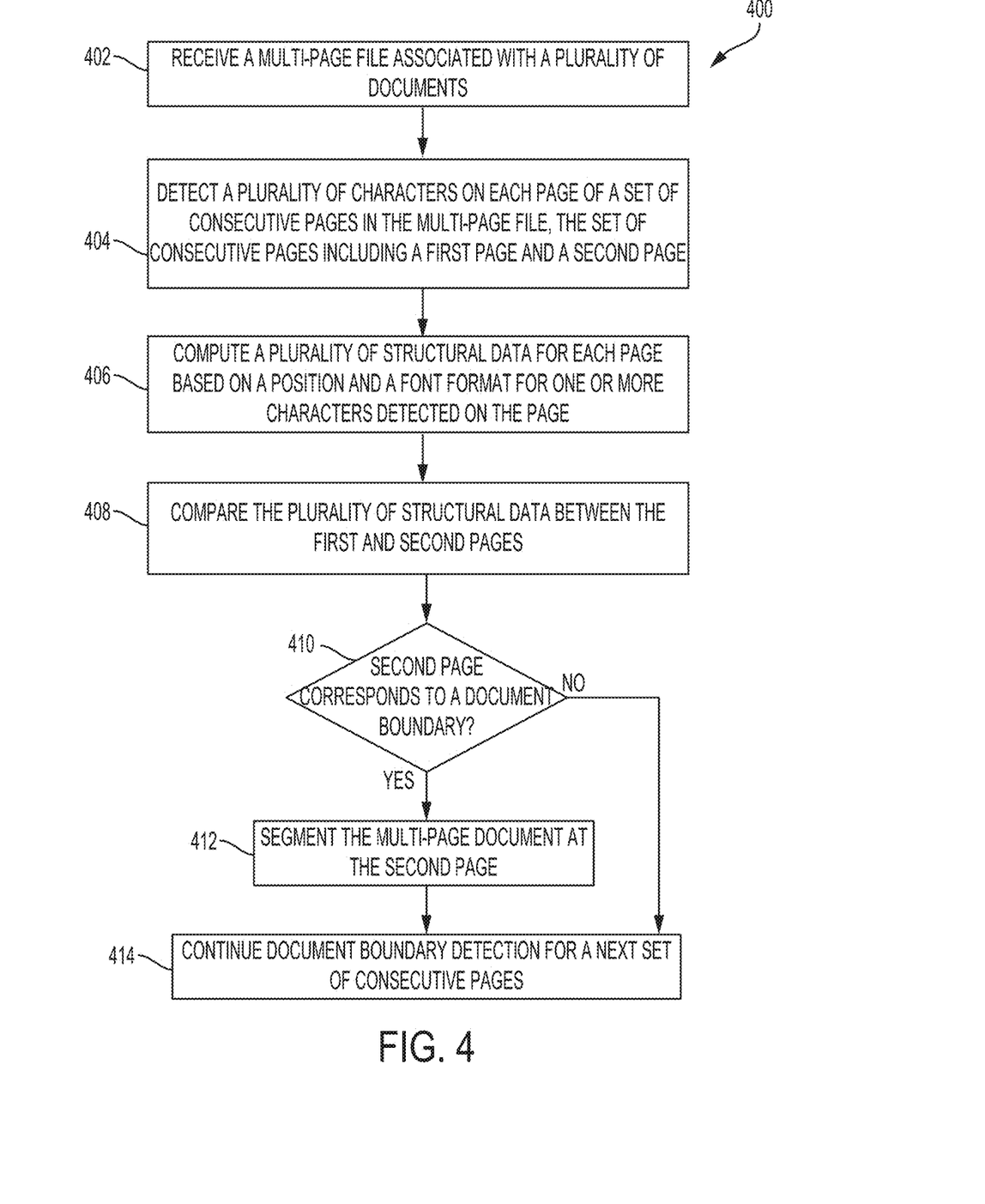
FIG. 4 illustrates a method for performing page stream segmentation, according to some embodiments.

FIG. 4 illustrates a method 400 for performing page stream segmentation, according to some embodiments. Method 400 can be performed by a page stream segmentation (PSS) application such as PSS application 110A, as described with respect to FIG. 1. Accordingly, one or more of steps 402-414 below may reference the components of PSS application 110A. Method 400 can be a computer-implemented method performed by a computing system with one or more processors and a memory (e.g., the computing system 600 illustrated in FIG. 6). Method 400 may be included in one or more programs stored in memory that, when executed by the one or more processors, cause the one or more processors to perform method 400.

In step 402, the PSS application receives a multi-page file associated with a plurality of documents. For example, one or more of the documents may be a scanned document (e.g., one of documents 132A-C being scanned). In some embodiments, the multi-page file can include a PDF file or a TIFF file.

In step 404, a character detector (e.g., character detector 112) of the PSS application detects a plurality of characters on each page of a set of consecutive pages in the multi-page file. In some embodiments, the set of consecutive pages includes at least a first page and a second page. In some embodiments, the first page precedes the second page. In some embodiments, the second page precedes the first page. In some embodiments, the set of consecutive pages includes at least three consecutive pages: a first page adjacent to and preceding a second page, the second page, and a third page adjacent to and following the second page. In some embodiments, the set of consecutive pages may be associated with a moving window of a predetermined number of consecutive pages being maintained by PSS application, as described above with respect to FIG. 3. In some embodiments, the predetermined number is at least two. In some embodiments, the predetermined number is at least three. In some embodiments, the character detector can implement optical character recognition (OCR) on each page to detect and recognize each character on that page.

In step 406, a structural data generator (e.g., structural data generator 114) of the PSS application computes a plurality of structural data (e.g., structural data 220) for each page based on a position and a font format for one or more characters detected on that page. In some embodiments, the structural data generator can compute the plurality of structural data for each page based on a position and a font format for each character detected on that page. For example, computed structural data may include page dimensions, statistical measures of font sizes, page margins, among other types of page-layout metadata 220A, font-related metadata 220B, or position-related metadata 220C, each of which are described above in greater detail with respect to FIG. 2.

In step 408, a document detector (e.g., document detector 118) compares the plurality of structural data between the first and the second pages of the set of consecutive pages to determine whether the second page corresponds to a boundary between two documents of the plurality of documents. In some embodiments in which the set of consecutive pages includes at least the first page preceding the second page, the second page, and a third page following the second page, the document detector can be configured to compares the plurality of structural data between the first and the second pages and between the second and the third pages to determine whether the second page corresponds to the boundary between the two documents of the plurality of documents. In some embodiments, the document detector can be configured to generate metadata comparisons (e.g., metadata comparisons 312A-B) between structural data of pages in each of one or more pairs of pages selected from the set of consecutive pages, as described above with respect to FIG. 3. In some embodiments, each of the one or more pairs of pages include the second page and another page (e.g., the first page) from the set of consecutive pages.

In step 410, the document detector determines whether the second page corresponds to the document boundary based on the structural data of each page of the set of consecutive pages. In some embodiments, the document detector determines whether the second page corresponds to the document boundary based on metadata comparisons of pages in each of one or more pairs of pages selected from the set of consecutive pages. If the second page is determined to correspond to the document boundary, method 400 proceeds to step 412. Otherwise, method 400 proceeds to step 414.

In some embodiments, the document detector can provide structural data of each page of the set of consecutive pages (e.g., the first and second pages), metadata comparisons between structural data of pages in each of one or more pairs of pages, or a combination thereof as inputs to a machine learning model (e.g., machine learning model 116 or machine learning model 314) to determine whether the second page corresponds to the document boundary. In some embodiments, the machine learning model can be configured to output a determination (e.g., yes or no) as to whether the second page of the set of consecutive pages corresponds to a document boundary based on the inputs being provided by the document detector.

In step 412, the document detector segments the multi-page file at the second page in response to determining that the second page corresponds to the boundary. In some embodiments, the document detector can segment the multi-page file by generating an indicator that the second page is a boundary between two documents. In some embodiments, the document detector provides the determination of whether the second page is a page boundary to a file splitter (e.g., file splitter 120) of the PSS application that performs the file splitting.

In some embodiments, the file splitter can be segment the multi-page file by generating at least two files to correspond to two documents of the plurality of documents based on the determination that the second page corresponds to the boundary between the two documents. For example, the file splitter may generate two files (i.e., a first file and a second file) where the first file includes the first page and the second file includes the second page. In this case, the second page is determined to be the beginning of a different, new document.

In some embodiments, as discussed above, the set of consecutive pages includes three pages: the first page preceding the second page, the second page, and a third page following the third page. In these embodiments, the first file generated by the file splitter may include the first page and the second file generated by the file splitter may include the second and third pages. In this case, the second page is determined to be the beginning of a different, new document. In another example, the file splitter may generate the first file to include the first and second pages and the second file to include the third page. In this case, the second page is determined to be the end of a document, which means the third page is the beginning of a different, new document.

In step 414, the PSS application continues to perform document boundary detection for a next set of consecutive pages in the multi-page file. For example, method 400 may return to step 404 for the next set of consecutive pages. In some embodiments, the PSS application next determines whether the third page corresponds to a document boundary based on the next set of consecutive pages. For example, where the set of consecutive pages is three consecutive pages, the next set of consecutive pages may include the second page, the third page, and a fourth page adjacent to and following the third page in the multi-page file. In some embodiments, by maintaining a moving window (e.g., moving window 308) of data associated with a predetermined (e.g., three) number of consecutive pages to determine whether a page of interest corresponds to a document boundary, PSS application 110A can minimize the amount of memory storage needed to store the various structural data computed for pages of multi-page file. In some embodiments, the predetermined number is at least two. In some embodiments, the predetermined number is at least three.

Figure 5:
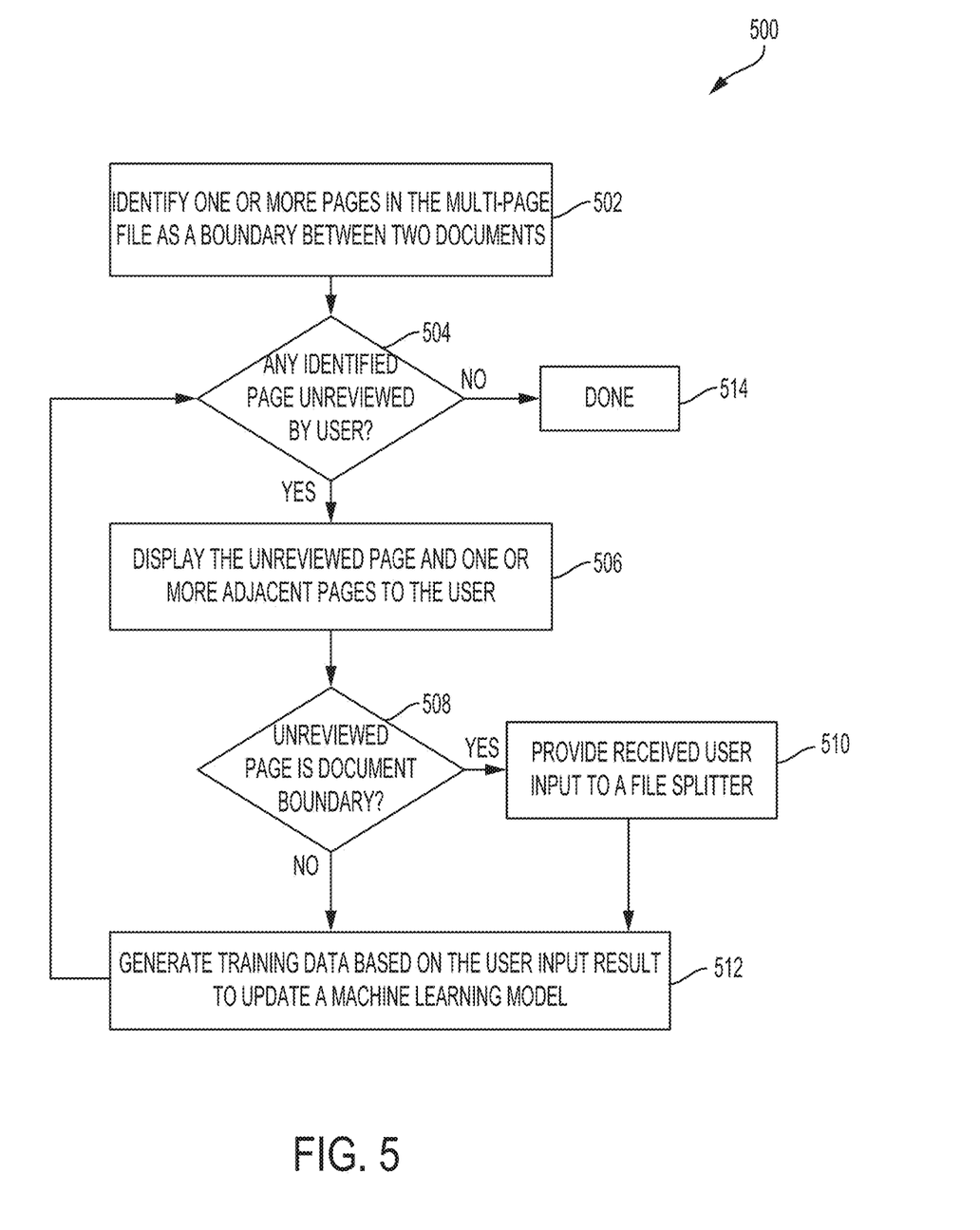
FIG. 5 illustrates a method for improving page stream segmentation accuracy based on user input, according to some embodiments.

FIG. 5 illustrates a method 500 for improving page stream segmentation accuracy based on user input, according to some embodiments. In some embodiments, method 500 expands upon step 412 related to segmenting a multi-page file at a page, as described above with respect to FIG. 4. Method 500 can be performed by a PSS application such as PSS application 110A, as described with respect to FIG. 1. Accordingly, one or more of steps 502-514 below may reference the components of PSS application 110A. Method 500 can be a computer-implemented method performed by a computing system with one or more processors and a memory (e.g., the computing system 600 illustrated in FIG. 6). Method 500 may be included in one or more programs stored in memory that, when executed by the one or more processors, cause the one or more processors to perform method 500.

In step 502, a document detector (e.g., document detector 118) of the PSS application identifies one or more pages in a multi-page file as a boundary between two documents. In some embodiments, the PSS application can identify the one or more pages based on method 400, as described above with respect to FIG. 4. In some embodiments, document detector can generate an indicator for each identified page of the one or more identified pages. For example, the one or more indicators may be generated and stored in metadata of the multi-page file or generated and stored in separate metadata. For example, the metadata storing the one or more indicators corresponding to the one or more identified pages may be a list or a string of binary values, page numbers of the multi-page file, or page ranges for a document. Example of metadata structure for storing indicators identifying document boundaries is described above with respect to machine learning model 116 and document detector 118 of FIG. 1.

In step 504, a boundary checker (e.g., boundary checker 122) of the PSS application determines whether any identified page from the one or more identified pages is unreviewed by a user. If such an identified page exists, method 500 proceeds to step 506. Otherwise, method 500 ends at step 514. In some embodiments, the one or more indicators generated for the corresponding one or more identified pages are used to track which pages have not been reviewed by the user.

In step 506, the boundary checker displays the unreviewed page and one or more adjacent pages to the user. In some embodiments, the boundary checker can display at least two pages: the unreviewed page and an adjacent page in the multi-page file (e.g., a page directly following or preceding the unreviewed page). In some embodiments, the boundary checker can display at least three pages: the unreviewed page, a page in the multi-page file directly before the unreviewed page, and a page in the multi-page file directly following the unreviewed page. The at least three displayed pages may correspond to the set of consecutive pages (i.e., a first, second, and third consecutive pages) being analyzed to determine whether a particular page (i.e., the second page in the set of consecutive pages) corresponds to the document boundary, as described above with respect to FIG. 4.

In step 508, the boundary checker prompts the user to input whether the unreviewed page is a document boundary to confirm the accuracy of the predictions of the document detector. If the boundary checker receives input from the user accepting the prediction of the unreviewed page as being the document boundary, method 500 proceeds to step 510. Otherwise, method 500 proceeds to step 512. After receiving the user's input for the unreviewed page, the boundary checker may update the indicators being tracked to remove the identified page as being an unreviewed page, according to some embodiments.

In step 510, the boundary checker provides the received user input (e.g., the user's acceptance of the page as being the document boundary) to a file splitter (e.g., file splitter 120) of the PSS application. Accordingly, in some embodiments, the file splitter can be configured to split the multi-page file at a particular page after receiving the user's acceptance of the identified document boundary. In some embodiments, instead of providing the user's acceptance of each of the one or more identified pages, boundary checker 122 can be configured to provide to the file splitter one or more of the identified pages accepted by the user as a document boundary. For example, boundary checker 122 may provide these accepted one or more pages to the file splitter in step 514 after each of the one or more pages identified in step 502 has been reviewed by the user.

In step 512, the boundary checker generates training data based on the user input received at step 508 to update a machine learning model (e.g., machine learning model 116 or machine learning model 314) used to perform page stream segmentation. In some embodiments, the training data includes the user's input and the portions of structural data used by the machine learning model to determine whether the page corresponds to a document boundary. Updating the machine learning model based on the user's input can improve the accuracy of future predicated document boundaries. For example, when the user's input indicates rejection of the page as being a document boundary, including the user's input in the training data may reduce the false positive rate of the machine learning model. Method 500 returns to step 504 where the boundary checker determines whether any of the one or more identified pages remains unreviewed by the user.

Figure 6:
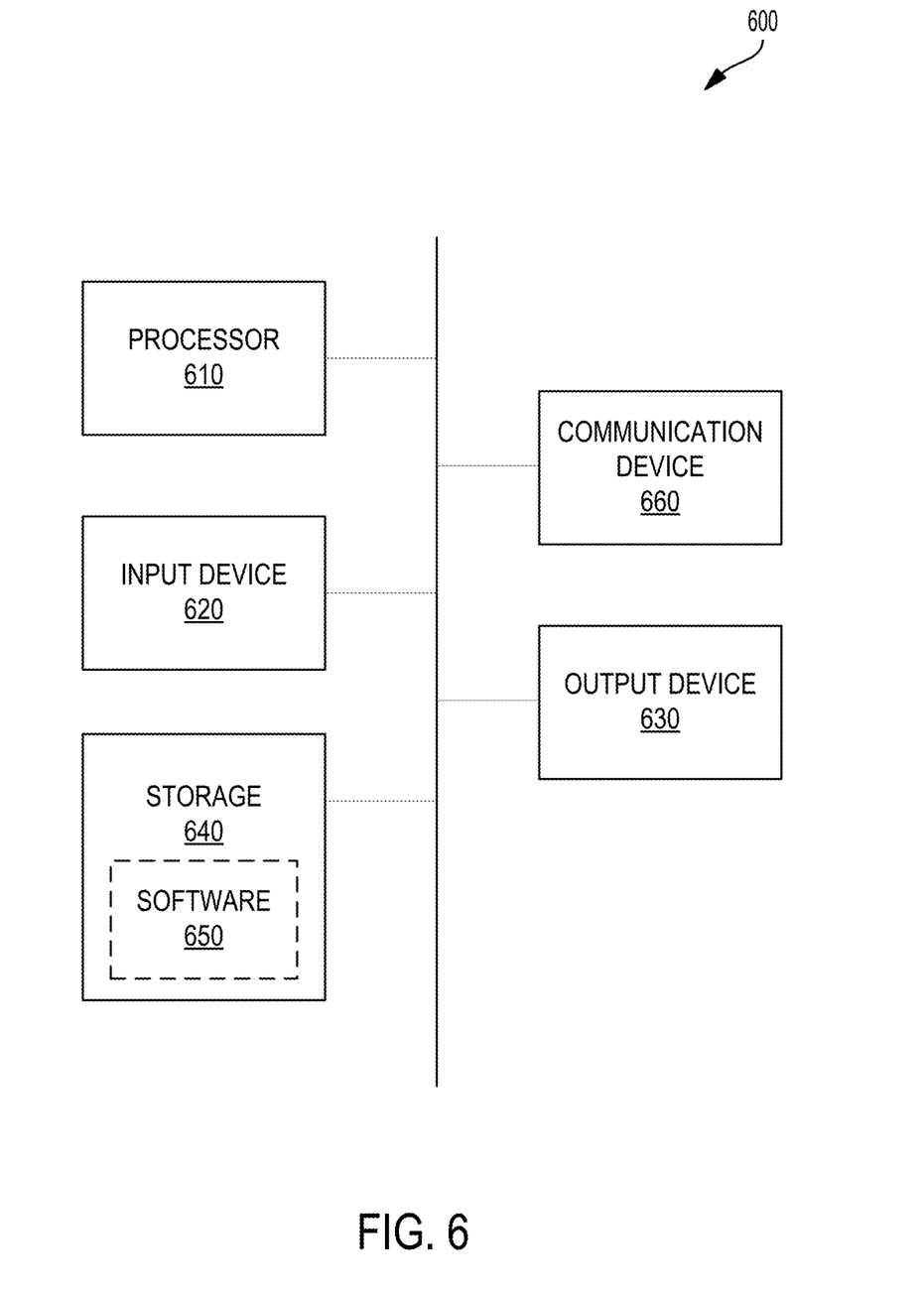
FIG. 6 illustrates an example of a computing device, according to some embodiments.

FIG. 6 illustrates an example of a computer in accordance with some embodiments. Computer 600 can be a component of a system for performing page stream segmentation according to the systems and methods described above, such as system 100 of FIG. 1, or can include the entire system itself. In some embodiments, computer 600 is configured to execute a method for performing page stream segmentation, such as methods 400 and 500 of FIGS. 4 and 5, respectively.

Computer 600 can be a host computer connected to a network. Computer 600 can be a client computer or a server. As shown in FIG. 6, computer 600 can be any suitable type of microprocessor-based device, such as a personal computer, workstation, server, or handheld computing device, such as a phone or tablet. The computer can include, for example, one or more of processor 610, input device 620, output device 630, storage 640, and communication device 660. Input device 620 and output device 630 can correspond to those described above and can either be connectable or integrated with the computer.

Input device 620 can be any suitable device that provides input, such as a touch screen or monitor, keyboard, mouse, or voice-recognition device. Output device 630 can be any suitable device that provides an output, such as a touch screen, monitor, printer, disk drive, or speaker.

Storage 640 can be any suitable device that provides storage, such as an electrical, magnetic, or optical memory, including a random access memory (RAM), cache, hard drive, CD-ROM drive, tape drive, or removable storage disk. Communication device 660 can include any suitable device capable of transmitting and receiving signals over a network, such as a network interface chip or card. The components of the computer can be connected in any suitable manner, such as via a physical bus or wirelessly. Storage 640 can be a non-transitory computer-readable storage medium comprising one or more programs, which, when executed by one or more processors, such as processor 610, cause the one or more processors to execute methods described herein, such as methods 400 and 500 of FIGS. 4 and 5, respectively.

Software 650, which can be stored in storage 640 and executed by processor 610, can include, for example, the programming that embodies the functionality of the present disclosure (e.g., as embodied in the systems, computers, servers, and/or devices as described above). In some embodiments, software 650 can include a combination of servers such as application servers and database servers.

Software 650 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 600 can implement any operating system suitable for operating on the network. Software 650 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer-readable storage medium stores one or more programs configured to be executed by one or more processors of an electronic device, the one or more programs including instructions for implementing any of the steps described or claimed herein. The present disclosure also relates to a device for performing the operations herein. This device may be specially constructed for the required purposes, or it may include a general-purpose computer selectively activated or reconfigured by a computer program stored in the computer. Such a computer program may be stored in a non-transitory, computer computer-readable storage medium, such as, but not limited to, any type of disk, including floppy disks, optical disks, CD-ROMs, magnetic-optical disks, read-only memories (ROMs), random access memories (RAMs), electrically program read-only memories (EPROMs), electronically erasable program read-only memories EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems appears from the description above. Also, the present disclosure is not described with reference to any particular programming language. It will be appreciated that a variety of programming languages may be used to implement the teachings of the present disclosure as described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A method for performing language-agnostic page stream segmentation, comprising:
   receiving a multi-page file associated with a plurality of documents;
   detecting a plurality of characters present on each page of a set of consecutive pages in the multi-page file, wherein the set of consecutive pages comprises a first page and a second page;
   computing a plurality of structural data for each page based on a position and a font format for one or more characters detected on that page;
   providing the plurality of structural data between the first page and the second page of the set of consecutive pages as inputs into a machine learning model configured to output a determination indicating whether the second page corresponds to a boundary between two documents of the plurality of documents;
   requesting a user to provide an input confirming an accuracy of the determination that the second page corresponds to the boundary;
   updating the machine learning model based on the plurality of structural data and the user input indicating the accuracy of the determination; and
   segmenting the multi-page file at the second page in response to determining that the second page corresponds to the boundary.

2. The method of claim 1, wherein the set of consecutive pages comprises a third page, and wherein the first page precedes the second page and the third page follows the second page, further comprising:
   comparing the plurality of structural data between the first and second pages of the set of consecutive pages and between the second and third pages of the set of consecutive pages to determine whether the second page corresponds to a boundary between two documents of the plurality of documents.

3. The method of claim 1, wherein segmenting the multi-page file comprises:
   storing an indicator that the second page is a boundary between two documents.

4. The method of claim 3, wherein segmenting the multi-page file at the second page comprises:
   requesting a user to confirm whether the indicator of the second page corresponds to the boundary between two documents; and
   splitting the multi-page file at the second page in response to receiving an input from the user indicating that the second page corresponds to the boundary.

5. The method of claim 1, wherein computing the plurality of structural data for each page comprises:

determining a position and a font format for each character of the plurality of characters detected on that page.

6. The method of claim 1, wherein detecting the plurality of characters on each page comprises:
performing optical character recognition (OCR) on the page to detect the plurality of characters present on the page.

7. The method of claim 6, wherein performing the OCR comprises:
for each page, generating a text layer comprising the plurality of characters for that page, wherein the text layer maintains the position and the font format for each character of the plurality of characters.

8. The method of claim 1, wherein the multi-page file comprises a Tagged Image File Format (TIFF) file or a Portable Document Format (PDF) file.

9. The method of claim 1, wherein computing the plurality of structural data for each page comprises:
determining a page size of each page.

10. The method of claim 1, wherein the font format comprises one or more of a font size, a font style, or a font type.

11. The method of claim 1, wherein computing the plurality of structural data for each page comprises:
determining a font size of each character on the page based on the font format; and
determining a minimum font size, a maximum font size, and one or more measures of central tendency for font size based on the font size determined for each character.

12. The method of claim 1, wherein the position for a character comprises two or more pairs of coordinates that define a region that the character occupies on the page.

13. The method of claim 1, wherein computing the plurality of structural data for each page comprises:
determining header and footer data for each page based on the position of each character, an upper threshold value, and a lower threshold value, wherein the header data includes a character having a position above the upper threshold value, and wherein the footer data includes a character having a position below the lower threshold value.

14. The method of claim 1, wherein comparing the plurality of structural data between the first and second pages of the set of consecutive pages comprises comparing header data, footer data, or header and footer data of the first and second pages.

15. The method of claim 14, wherein comparing the header data, the footer data, or the header and footer data of the first and second pages comprises at least one of:
comparing the header data of the first and second pages;
comparing the footer data of the first and second pages; or
comparing the footer data of the first page with the header data of the second page.

16. The method of claim 14, wherein comparing the header data, the footer data, or the header and footer data of the first and second pages comprises at least one of:
calculating a cosine similarity between the header data of the first and second pages;
calculating a cosine similarity between the footer data of the first and second pages;
calculating a cosine similarity between the footer data of the first page and the header data of the second page; or
calculating a cosine similarity between the footer data of the second page and the header data of the first page.

17. The method of claim 1, wherein segmenting the multi-page file comprises:
generating at least two files to correspond to two documents of the plurality of documents based on the determination that the second page corresponds to the boundary.

18. The method of claim 17, wherein the set of consecutive pages comprises a third page, wherein the first page precedes the second page and the third page follows the second page, wherein the at least two files comprises a first file and a second file, and wherein generating the at least two files comprises one of:
generating the first file to include the first page and the second file to include the second and third pages; or
generating the second file to include the third page and the first file to include the first and second pages.

19. The method of claim 1, wherein the first page precedes the second page.

20. The method of claim 1, wherein the second page precedes the first page.

21. The method of claim 1, wherein the multi-page file comprises a plurality of pages including the set of consecutive pages, and wherein the method comprises:
comparing the plurality of structural data of the second page in the set of consecutive pages with the plurality of structural data in each other page of the set of consecutive pages to determine whether the second page corresponds to the boundary between two documents of the plurality of documents.

22. The method of claim 21, wherein the set of consecutive pages comprises a predetermined number of consecutive pages that is at least three.

23. The method of claim 21, wherein the set of consecutive pages comprises a first subset of consecutive pages adjacent to and preceding the second page and comprises a second subset of consecutive pages adjacent to and following the second page.

24. The method of claim 23, wherein the first subset of consecutive pages comprises a first predetermined number of consecutive pages and the second subset of consecutive pages comprises a second predetermined number of consecutive pages.

25. The method of claim 24, wherein the first and second predetermined numbers are user configurable.

26. The method of claim 1, wherein the multi-page file comprises a plurality of pages, and wherein the method comprises:
for each page in the plurality of pages:
computing a plurality of structural data for a set of consecutive pages specific to and including the page, and
comparing the plurality of structural data of the page with the plurality of structural data of each other page in the set of consecutive pages specific to the page to determine whether the page corresponds to a boundary between two documents of the plurality of documents.

27. A system for performing language-agnostic page stream segmentation, comprising:
one or more processors and memory storing one or more programs that when executed by the one or more processors cause the one or more processors to:
receive a multi-page file associated with a plurality of documents;

detect a plurality of characters present on each page of a set of consecutive pages of the multi-page file, wherein the set of consecutive pages comprises a first page and a second page;

compute a plurality of structural data for each page based on a position and a font format for each character of the plurality of characters detected on that page;

provide the plurality of structural data between the first page and the second page of the set of consecutive pages as inputs into a machine learning model configured to output a determination indicating whether the second page corresponds to a boundary between two documents of the plurality of documents;

request a user to provide an input confirming an accuracy of the determination that the second page corresponds to the boundary;

update the machine learning model based on the plurality of structural data and the user input indicating the accuracy of the determination; and segment the multi-page file at the second page in response to determining that the second page corresponds to the boundary.

28. A non-transitory computer-readable storage medium storing one or more programs configured to be executed by one or more processors of a device with one or more processors and memory, the one or more programs including instructions for:

receiving a multi-page file associated with a plurality of documents;

detecting a plurality of characters present on each page of a set of consecutive pages in the multi-page file, wherein the set of consecutive pages comprises a first page and a second page;

computing a plurality of structural data for each page based on a position and a font format for one or more characters detected on that page;

providing the plurality of structural data between the first page and the second page of the set of consecutive pages as inputs into a machine learning model configured to output a determination indicating whether the second page corresponds to a boundary between two documents of the plurality of documents;

requesting a user to provide an input confirming an accuracy of the determination that the second page corresponds to the boundary;

updating the machine learning model based on the plurality of structural data and the user input indicating the accuracy of the determination; and segmenting the multi-page file at the second page in response to determining that the second page corresponds to the boundary.

\* \* \* \* \*